Oct. 14, 1952      D. W. HUGHES      2,613,804
SEALABLE FOOD CONTAINER
Filed May 24, 1950
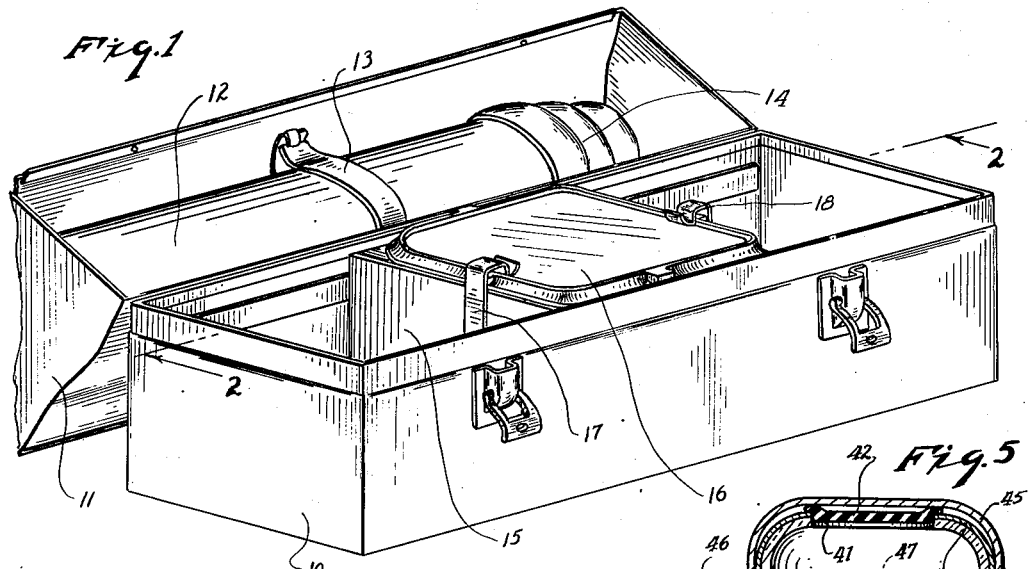
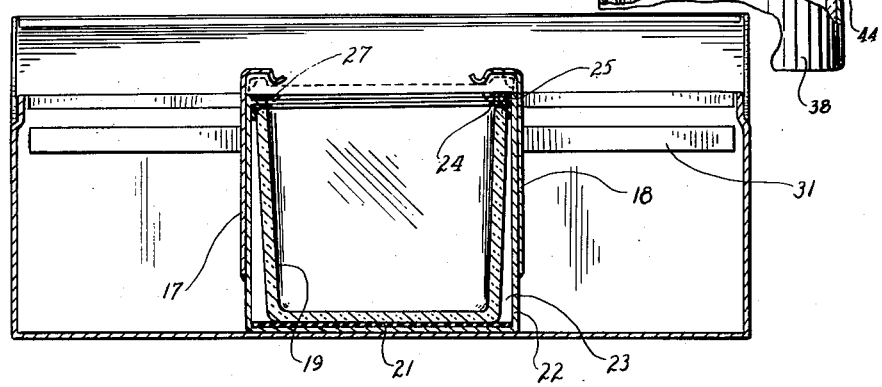
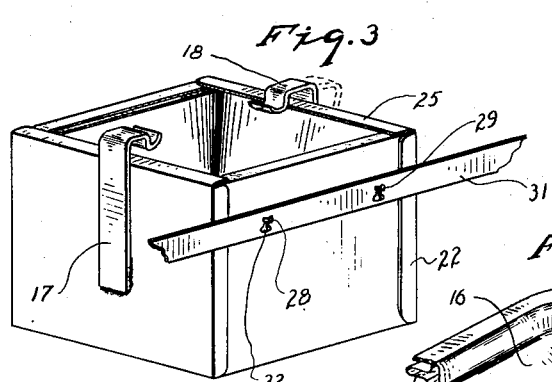
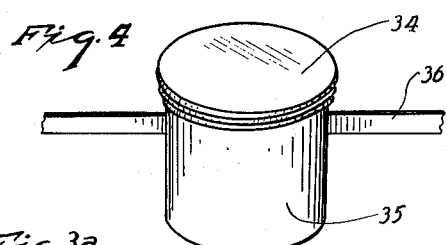
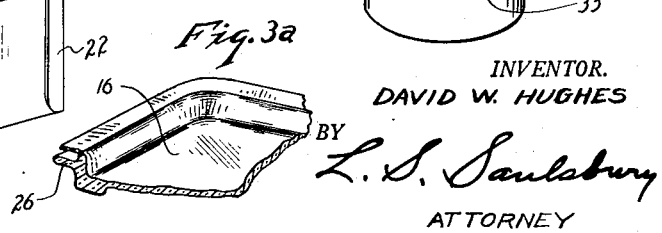
INVENTOR.
DAVID W. HUGHES
BY L. S. Saulsbury
ATTORNEY Patented Oct. 14, 1952

2,613,804

UNITED STATES PATENT OFFICE 2,613,804

SEALABLE FOOD CONTAINER

David Wendell Hughes, Phoenix, Ariz.

Application May 24, 1950, Serial No. 163,929

1 Claim. (Cl. 206—4)

This invention relates to lunch baskets.

It is an object of the present invention to provide in a lunch basket a Thermos type of container adapted to contain bulk food and to keep it at its initial temperature.

It is another object of the present invention to provide a Thermos receptacle for lunch baskets adapted to fit the bottom of the same intermediate the length thereof and which has means attached to the same to prevent the sliding of the receptacle in the lunch basket, and wherein the spacing member may be removed from the receptacle at times when the receptacle is taken from the lunch basket.

Other objects of the present invention are to provide a Thermos receptacle having a wide open top which is of simple construction, inexpensive to manufacture, adapted to readily fit within the lunch basket, compact, has a minimum number of parts and efficient in operation.

For other objects and for a better understanding of the invention, reference may be had to the following detailed description taken in connection with the accompanying drawing, in which Fig. 1 is a perspective view of a lunch basket having a bottom part and a top part and having the Thermos receptacle embodying the features of the present invention.

Fig. 2 is a longitudinal sectional view taken on line 2—2 of Fig. 1.

Fig. 3 is a perspective view of the receptacle removed from the lunch basket and looking upon the spacing bar.

Fig. 3a is a fragmentary perspective view of the cover.

Fig. 4 is a perspective view of a modified form of receptacle, the same being of cylindrical shape and having a screw cover.

Fig. 5 is a fragmentary sectional view of a modified form of receptacle.

Referring now to the figures, 10 represents a bottom part of a lunch basket to which is pivoted a cover member 11 of sufficient depth as to receive and retain an ordinary Thermos bottle 12. This bottle is held in place by a clasp member 13. The bottle has the usual screw cap cover 14.

Within the bottom part 10 is a Thermos receptacle 15 having a cover part 16 adapted to be secured by spring clips 17 and 18 on the receptacle.

The receptacle further includes an inner glass tumbler or vessel 19 which rests upon the insulating piece 21 in the bottom of a metal receptacle 22. Surrounding the vessel 19 is an air space or vacuum 23. A sealing ring 24 is provided beneath the latch 25 of the outer casing 22.

The cover 16 has a flange 26, the under face of which rests against seal 24. The under face of the flange 26 engages with a second sealing ring 27 which rests on the top of the inwardly bent flange 25 of the metal receptacle. The cover 16 is made of glass and is held in place upon the seal 27 by the spring clips 17 and 18 secured to the outer faces of the sides of the metal shell.

In order to keep the container in spaced relationship with respect to the ends of the bottom 10, one side of the shell 23 is provided with pins 28 and 29. A spacing bar 31 is provided with key hole slots 32 and is placed over the pins 28 and 29. To keep the spacing bar in place, the ends of the same will abut the ends of the bottom part 10 and will thereby keep the container properly spaced within the bottom 10.

In Fig. 4, there is shown a modified form of container. This container is of cylindrical shape and has a screw cover 34. This container is shown at 35. A bar 36 is connected to the container 35 and will, in the manner above described, keep the container from sliding in the lunch basket. By having the spacing bar removable from the container, it will not give trouble when the container is outside of the lunch basket.

In Fig. 5, there is shown a modified form of receptacle comprising a container body 38 having a rounded top portion 39. This top portion has an opening 41 adapted to receive an insulated cap member 42. The body 38 has an inner glass lining 43.

On the exterior of the body 38 are threads 44 for receiving internal threads of a round top cover 45 which serves as a cup when detached from the receptacle. The body 38 and the cover 45 are preferably formed of metal. It will be apparent that the receptacle 38 is of such shape as to fit the main part 10. The spacing bar is connected to the metal cap 45 as indicated at 47.

It will be seen that there has been provided a simple construction for a Thermos container and also a simple means for keeping the container properly spaced in the lunch basket.

While various changes may be made in the detail construction, it shall be understood that such changes shall be within the spirit and scope of the present invention as defined by the appended claim.

I claim:

A sealable food container for fitting within a lunch basket and comprising a main vessel part, said main vessel part having a flat bottom and a rounded top with an opening therein, a lining within the vessel and extending under the rounded top, an insulating cover fitting within the rounded top opening, a cover cap internally threaded and extending over the vessel and contacting the insulating cover, said vessel having threads receiving the threads of the cover cap, and an elongated spacing bar rigidly connected intermediate its length to the cover cap at a point located laterally thereon, said bar extending on each side beyond said cap in a plane substantially parallel with the flat bottom and normally engageable within the lunch basket to prevent the sliding of the container therewithin.

DAVID WENDELL HUGHES.

REFERENCES CITED

The following references are of record in the file of this patent:

UNITED STATES PATENTS

| Number | Name | Date |
|---|---|---|
| 314,227 | Cooper | Mar. 24, 1885 |
| 1,179,725 | Iversen | Apr. 18, 1916 |
| 1,492,443 | Francis | Apr. 29, 1924 |
| 2,191,016 | Hoffman | Feb. 20, 1940 |
| 2,232,366 | Chappell | Feb. 18, 1941 |
| 2,438,434 | Friedman | Mar. 23, 1948 |